United States Patent
Stolen et al.

[11] Patent Number: 5,828,802
[45] Date of Patent: Oct. 27, 1998

[54] SELF-TUNING OPTICAL WAVEGUIDE FILTER

[75] Inventors: Rogers Hall Stolen, Rumson; Ashish Madhukar Vengsarkar, Berkeley Heights, both of N.J.; Jau-Sheng Wang, New Haven, Conn.

[73] Assignee: Lucent Technologies, Inc., Murray Hill, N.J.

[21] Appl. No.: 803,051

[22] Filed: Feb. 19, 1997

[51] Int. Cl.[6] ............................................ G02B 6/26
[52] U.S. Cl. .................. 385/27; 385/122; 385/123; 385/142
[58] Field of Search ..................... 385/15, 27–30, 385/39, 122, 123, 141, 142

[56] References Cited

U.S. PATENT DOCUMENTS

| | | | |
|---|---|---|---|
| 4,778,237 | 10/1988 | Sorin et al. | 385/122 |
| 4,781,425 | 11/1988 | Risk et al. | 385/28 X |

FOREIGN PATENT DOCUMENTS

95/32451  11/1995  WIPO .

OTHER PUBLICATIONS

Zervas, M.N., et al., "Twin–Core Fiber Erbium–Doped Channel Equalizer", *8217 Journal of Lightwave Technology*, 13(1995) May, No. 5, New York, NY, US, pp. 721–731.

*Primary Examiner*—John D. Lee
*Attorney, Agent, or Firm*—Mathews, Collins, Shepherd & Gould, P.A.

[57] ABSTRACT

A self-tuning optical waveguide filter for attenuating a lower power light signal at $\lambda_1$ more than a higher power signal at $\lambda_2$ comprises a length of single core waveguide and a light injector for applying $\lambda_1$, $\lambda_2$ into the waveguide in two propagating modes subject to mode beating. The mode beating produces high intensity regions of $\lambda_1$ physically displaced from high intensity regions of $\lambda_2$. A portion of the waveguide is doped with a saturable absorber for disproportionately attenuating wavelengths at lower power levels. Advantageously the waveguide is a single-core fiber having its central core doped with rare-earth saturable absorber. In a preferred embodiment, the fiber is dimensioned to propagate $\lambda_1$, $\lambda_2$ in the $LP_{01}$ and $LP_{02}$ modes, and the saturable absorber is Erbium.

7 Claims, 2 Drawing Sheets

SELF-TUNING OPTICAL WAVEGUIDE FILTER

FIELD OF THE INVENTION

The present invention relates to optical waveguide devices, and in particular, to a self-tuning optical waveguide filter based on mode beating and absorption saturation.

BACKGROUND OF THE INVENTION

Optical fibers are key components in modern telecommunications systems. An optical fiber is a thin strand of glass capable of transmitting an optical signal containing a large amount of information over long distances. In essence, it is a small diameter waveguide characterized by a core with a first index of refraction surrounded by a cladding having a second (lower) index of refraction. Typical optical fibers are made of high purity silica with minor concentrations of dopants to control the index of refraction.

A self-tuning filter capable of selectively attenuating optical signals outside a dominant wavelength band would be highly useful in telecommunications. For example, a telecommunications fiber may carry a single high-power communications channel centered about a wavelength $\lambda_2$. However due to imperfections in the system, the fiber may also carry an unwanted second signal, such as a crosstalk signal, at a lower power level and at a different wavelength $\lambda_1$. Furthermore the unwanted signal $\lambda_1$ may be from any one of many different wavelength channels in a wavelength division multiplexed system.

Since conventional optical waveguide Bragg filters are notoriously narrow band, exclusion of unwanted signals at several different wavelengths would require several different filters, each designed for a specific different wavelength. This approach becomes increasingly expensive as the number of channels increases. What is needed is a self-tuning filter that will automatically attenuate lower power signals relative to the higher power signal.

Efforts have been made to produce a self-tuning fiber using a twin core, Erbium-doped fiber. See R. I. Laming et al., "Twin-core Erbium-doped Fibre Amplifier With Passive Spectral Gain Equalization", *Electronic Letters,* Vol. 29, pp. 509–510, (Mar. 18, 1993) and M. N. Zervas et al., "Twin-core Fiber Erbium-doped Channel Equalizer", *J. Lightwave Tech.,* Vol. 13, No. 5, pp. 721–731 (May 1995). Multiplexed light introduced into one of the two cores will alternate periodically between the two cores with a period depending on the light wavelength. A stronger signal at wavelength $\lambda_2$ will saturate the Erbium absorbing material along its alternating path. A weaker signal at a different wavelength $\lambda_1$ will encounter unsaturated absorbing material and will experience higher loss. The device thus acts as a self-tuning optical filter in which absorption is minimized at the peak wavelength of the stronger signal and absorption is greater at wavelengths of the weaker signal.

This two-core approach, however, suffers many difficulties. At the outset, twin core fiber is difficult to make and difficult to couple to the single core fibers used in most communications applications. In addition, the twin core geometry produces birefringence, is subject to data rate limiting interactions and loses about half its power (3 dB) at the output. Accordingly there is a need for an improved self-tuning optical waveguide filter.

SUMMARY OF THE INVENTION

In accordance with the invention, a self-tuning optical waveguide filter for attenuating a lower power light signal at $\lambda_1$ more than a higher power signal at $\lambda_2$ comprises a length of single core waveguide and a light injector for applying $\lambda_1$, $\lambda_2$ into the waveguide in two propagating modes subject to mode beating. The mode beating produces high intensity regions of $\lambda_1$ physically displaced from high intensity regions of $\lambda_2$. A portion of the waveguide is doped with a saturable absorber for disproportionately attenuating wavelengths at lower power levels. Advantageously the waveguide is a single-core fiber having its central core doped with rare-earth saturable absorber. In a preferred embodiment, the fiber is dimensioned to propagate $\lambda_1$, $\lambda_2$ in the $LP_{01}$ and $LP_{02}$ modes, and the saturable absorber is Erbium.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It should be understood that these drawings are to illustrate the concepts of the invention and are not to scale.

DETAILED DESCRIPTION

Figure 1:
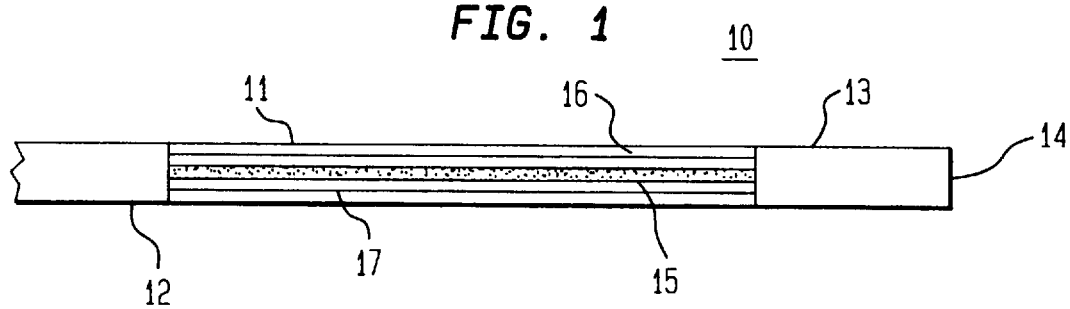
FIG. 1 is a schematic cross section of a preferred self-tuning optical waveguide filter.

Referring to the drawings, FIG. 1 is a schematic cross section of a self-tuning optical waveguide filter 10 comprising a length of optical waveguide 11 dimensioned to propagate a desired range of wavelengths (including $\lambda_1$ and $\lambda_2$) in a pair of beating propagating modes. A light injector 12 is provided for introducing in both modes, light in both a higher power band centered around wavelength $\lambda_2$ and lower power band centered around a different wavelength $\lambda_1$. A mode filter 13 is advantageously provided upstream from the output 14 so that light from only one of the modes passes from the output. The waveguide is provided with at least one region 15 doped with a saturable absorber, such as a rare earth material, in position for receiving light propagating through the waveguide.

In the preferred embodiment, the waveguide 11 is an optical fiber having a cladding 16 and a single core 17 dimensioned to propagate $\lambda_2$, $\lambda_1$ in the $LP_{01}$ and $LP_{02}$ modes. The dimensions required to propagate specific wavelengths in these modes are set forth in D. Gloge, "Weakly Guiding Fibers," *Applied Optics,* Vol. 10, pp. 2252–2258 (1971), which is incorporated herein by reference. The saturable absorber is Erbium, and the doped region 15 is the central region of the core 17.

In operation, the wavelength-dependent beating between the two modes produces high intensity regions of $\lambda_1$ and $\lambda_2$ which are physically separated. When light in these physically separated regions interacts with the saturable absorber, the lower power light $\lambda_1$ is absorbed more strongly than the higher power light $\lambda_2$. Thus the lower power light $\lambda_1$ is attenuated more than $\lambda_2$.

Figure 2:
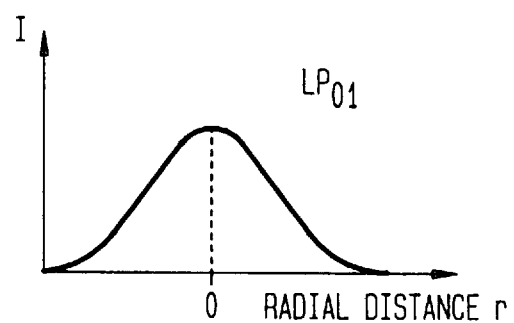
FIGS. 2 and 3 respectively illustrate the $LP_{01}$ and $LP_{02}$ modes propagated in the waveguide of FIG. 1.
Figure 3:
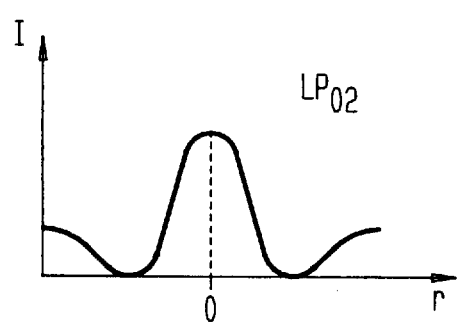
Figure 4:
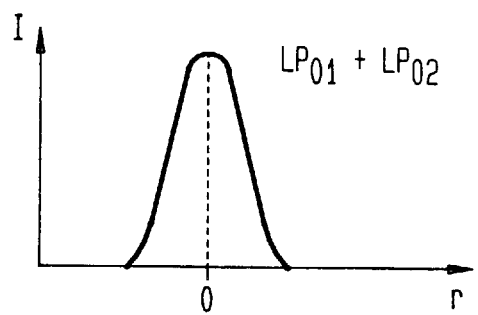
FIGS. 4 and 5 illustrate the sum and difference of the $LP_{01}$ and $LP_{02}$ modes.
Figure 5:
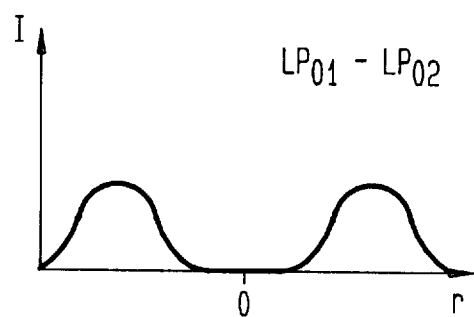
Figure 6:
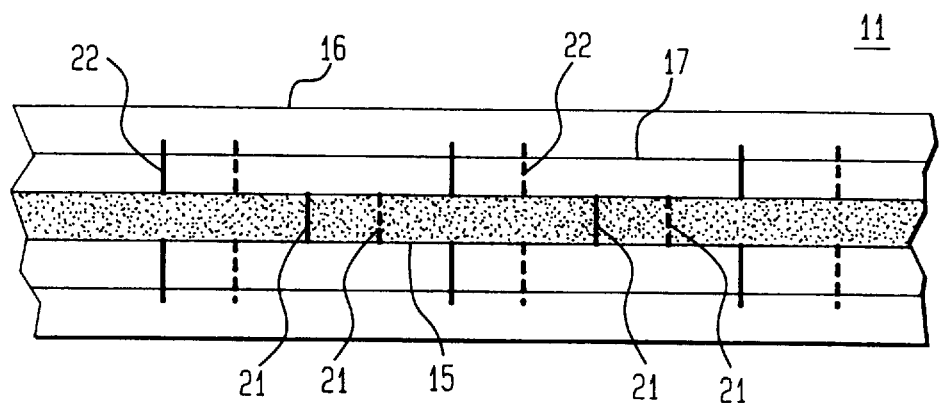
FIG. 6 illustrates the propagated signal at various points along the FIG. 1 device.

This general effect can be better understood by the consideration of the preferred embodiment using the $LP_{01}$ and $LP_{02}$ modes. FIG. 2 shows the radial distribution of $LP_{01}$ light, and FIG. 3 shows the distribution of $LP_{02}$ light. When the two modes constructively interfere, the sum concentrates light narrowly in the center of the fiber as shown in FIG. 4. When they destructively interfere, the difference concentrates in a ring near the periphery of the fiber as shown in FIG. 5. Thus the beating between the $LP_{01}$ and $LP_{02}$ modes produces a sequence of alternating peripheral rings and central spots along the length of the fiber. The periodic distance between ring and spot (half the beat length) depends upon the wavelength of the light, so that the spots for $\lambda_2$ and those for $\lambda_1$ will gradually separate with increasing length along the waveguide. FIG. 6 schematically illustrates this pattern of separation. The solid lines represent the beat extrema of $\lambda_1$ and the dotted lines the extrema of $\lambda_2$. The mode beating thus produces physically separated, high intensity regions 21 (central spots) of $\lambda_1$, $\lambda_2$ which interact with the saturable absorber 15 in the central core to selectively attenuate the lower power signal $\lambda_1$. In this embodiment, the beat rings 22 have little interaction with the absorber.

The light injector 12 can be a length of input fiber with an appropriately dimensioned core. The simplest structure is a fiber having a core with dimensions to match the small central spot size of the sum of the $LP_{01}$ and the $LP_{02}$ modes. Alternatively and, preferably, the fiber is dimensioned to propagate the $LP_{01}$ mode and provided with a fiber long period grating to convert the proper fraction of the $LP_{01}$ power into the $LP_{02}$ mode. This latter approach produces a smaller central spot size so that less power is required for saturation. Such injectors are described in greater detail in F. Bilodeau et al., "Efficient Narrowband $LP_{01} \rightarrow LP_{02}$ Mode Converters in Photosensitive Fiber", *Electronic Letters,* Vol. 27, pp. 682–684 (1991) and K. O. Hill, U.S. Pat. No. 5,104,209 (1992), which are incorporated herein by reference.

The mode filter 13 for removing the $LP_{02}$ mode helps make the device insensitive to small changes in length and wavelength. The mode filter can be a fiber loop, a tapered fiber or a long period grating that couples the mode to be filtered into a non-guided mode.

The same self-tuning filter effect can be produced in planar (rectangular) waveguides including a single core region and a saturable absorber by the use of mode beating between the $E_{11}{}^x$ mode and the $E_{22}{}^x$ mode. Details concerning waveguides for propagating these modes can be found in E. A. J. Marcatilli, "Dielectric Rectangular Waveguides and Directional Couplers for Integrated Optics," *Bell System Technical Journal,* Vol. 48, pp. 2071–2102 (1969) which is incorporated herein by reference.

The invention can be better understood by consideration of the following specific example.

EXAMPLE

As an example, we choose a step-index fiber with a core-cladding index difference of 0.02 and a core diameter of 9.2 μm so the characteristic "V" number is 4.5. In such a fiber, the $LP_{01}$ mode field radius is within the range of typical dispersion-shifted fibers, and the group velocities of the $LP_{01}$ and $LP_{02}$ modes are matched. The Erbium doped region is the center 20% of the core. The beat length between the $LP_{01}$ and $LP_{02}$ modes is approximately 100 μm. The doping concentration is such that the absorption coefficient times the fiber length equals 200 in a uniformly-doped fiber. (Note that the actual absorption will be much less in the center-doped fiber because only the center part of the sum of the $LP_{01}$ and $LP_{02}$ modes experience absorption.) For a fiber 40 meters long the bandwidth is approximately 0.3 nm. Saturation power for this Erbium doping concentration is 100–500 microwatts.

The advantages of applicant's single core self-tuning filter over the twin-core device of Laming et al. are manyfold.

1. The fiber is axially symmetric. Fabrication of an axially symmetric fiber uses standard techniques and is thus simpler than fabrication of a twin-core fiber.

2. The fiber has a single central core. Coupling light in and out of a single central core is easier than coupling to one core of a twin-core fiber, 3. The $LP_{01}$–$LP_{02}$ device has no inherent polarization dependence so there is no preferred polarization direction. Any residual local birefringence can be averaged out by spinning the fiber preform during the fiber draw. A twin-core fiber, in contrast, has an intrinsic birefringence because of its geometry.

4. Intermodal dispersion causes the supermodes of a twin-core fiber to separate at the end of the fiber which will limit the data rate of the fiber devices based on linear and nonlinear interactions in twin-core fibers. (See K. S. Chiang, *Opt. Lett.,* Vol. 20, p. 997, (1995)) This is not necessarily true of fiber devices based on $LP_{01}$–$LP_{02}$ mode beating because there is always some wavelength where the group velocities of the $LP_{01}$ and $LP_{02}$ modes are the same.

5. The optimum mix of power in a step-index fiber has approximately ⅔ of the power in the $LP_{01}$ mode and ⅓ in the $LP_{02}$ mode. Thus the removal of the $LP_{02}$ mode at the end of the device costs only ~2 dB rather than the half the power (3 dB) in the twin-core fiber.

6. Various features of the $LP_{01}$–$LP_{02}$ mode device can be modified by changing the refractive index profile of the fiber. For example, the beat length can be increased or decreased by rings of reduced or increased index in the refractive index profile. The wavelength sensitivity can be varied by adjusting the relative slopes of effective refractive index vs. frequency for the $LP_{01}$ and $LP_{02}$ modes.

It is to be understood that the above-described embodiments are illustrative of only a few of the many possible specific embodiments which can represent applications of the principles of the invention. Numerous and varied other arrangements can be devised by those skilled in the art without departing from the spirit and scope of the invention.

What is claimed:

1. A self-tuning optical waveguide filter for attenuating a lower power light signal at a first wavelength $\lambda_1$ more than a higher power signal at a second wavelength $\lambda_2$, said filter comprising:

a length of single-core optical waveguide comprising a core and a cladding, said waveguide dimensioned for propagating said signals $\lambda_1$, $\lambda_2$ each in at least two propagating modes, said propagating modes beating to produce in said waveguide relatively high intensity regions of $\lambda_1$, $\lambda_2$;

a light injector for injecting into said waveguide light of said signals $\lambda_1$, $\lambda_2$ each in said two propagating modes; and a saturable absorbing material disposed in said waveguide for interacting with said high intensity regions of $\lambda_1$, $\lambda_2$, whereby the lower power signal $\lambda_1$ is absorbed more strongly in said saturable absorbing material than the higher power signal $\lambda_2$.

2. A self-tuning filter according to claim 1 wherein said optical waveguide comprises optical fiber.

3. A self-tuning filter according to claim 2 wherein said propagating modes comprise the $LP_{01}$ and $LP_{02}$ modes.

4. A self-tuning filter according to claim 3 wherein said saturable absorbing material is disposed in the core of said fiber.

5. A self-tuning filter according to claim 3 further comprising a mode filter for filtering out the $LP_{02}$ mode.

6. A self-tuning filter according to claim 1 wherein said saturable absorbing material comprises a rare-earth element.

7. A self-tuning filter according to claim 1 wherein said waveguide comprises rectangular waveguide.

* * * * *